US007500350B1

(12) United States Patent
Jacobson et al.

(10) Patent No.: US 7,500,350 B1
(45) Date of Patent: Mar. 10, 2009

(54) ELIMINATION OF LIFETIME LIMITING MECHANISM OF HALL THRUSTERS

(75) Inventors: David T. Jacobson, Lakewood, OH (US); David H. Manzella, Cleveland, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 599 days.

(21) Appl. No.: 11/044,471

(22) Filed: Jan. 28, 2005

(51) Int. Cl.
*H05H 1/00* (2006.01)
*B64G 9/00* (2006.01)

(52) U.S. Cl. ........................................ 60/202; 60/204

(58) Field of Classification Search .................. 60/202, 60/204, 203.1, 200.1, 310, 376, 219
See application file for complete search history.

(56) References Cited

U.S. PATENT DOCUMENTS

| | | | |
|---|---|---|---|
| 3,983,695 | A | 10/1976 | Power |
| 4,011,719 | A | 3/1977 | Banks |
| 4,298,817 | A | 11/1981 | Carette et al. |
| 4,825,646 | A | 5/1989 | Challoner et al. |
| 4,862,032 | A | 8/1989 | Kaufman et al. |
| 5,218,271 | A | 6/1993 | Egorov et al. |
| 5,359,258 | A | 10/1994 | Arkhipov et al. |
| 5,475,354 | A | 12/1995 | Valentian et al. |
| 5,581,155 | A | 12/1996 | Morozov et al. |
| 5,646,476 | A | 7/1997 | Aston |
| 5,763,989 | A | 6/1998 | Kaufman |
| 5,798,602 | A | 8/1998 | Gopanchuk et al. |
| 5,838,120 | A | 11/1998 | Semenkin et al. |
| 5,845,880 | A | 12/1998 | Petrosov et al. |
| 5,847,493 | A | 12/1998 | Yashnov et al. |
| 5,892,329 | A | 4/1999 | Arkhipov et al. |
| 5,924,277 | A | 7/1999 | Beattie et al. |
| 5,945,781 | A | 8/1999 | Valentian |

(Continued)

FOREIGN PATENT DOCUMENTS

| | | |
|---|---|---|
| DE | 198 28 704 A1 | 6/1998 |

(Continued)

OTHER PUBLICATIONS

Electrak 2000 Programmable Actuator Systems Manual.*

(Continued)

*Primary Examiner*—Michael Cuff
*Assistant Examiner*—Gerald L Sung
(74) *Attorney, Agent, or Firm*—Squire, Sanders & Dempsey LLP

(57) ABSTRACT

A Hall thruster includes inner and outer electromagnets, with the outer electromagnet circumferentially surrounding the inner electromagnet along a centerline axis and separated therefrom, inner and outer poles, in physical connection with their respective inner and outer electromagnets, with the inner pole having a mostly circular shape and the outer pole having a mostly annular shape, a discharge chamber separating the inner and outer poles, a combined anode electrode/gaseous propellant distributor, located at an upstream portion of the discharge chamber and supplying propellant gas and an actuator, in contact with a sleeve portion of the discharge chamber. The actuator is configured to extend the sleeve portion or portions of the discharge chamber along the centerline axis with respect to the inner and outer poles.

25 Claims, 4 Drawing Sheets

U.S. PATENT DOCUMENTS

| | | | |
|---|---|---|---|
| 6,075,321 A | 6/2000 | Hruby | |
| 6,158,209 A | 12/2000 | Latischev et al. | |
| 6,191,851 B1 * | 2/2001 | Kirkham et al. | 356/243.4 |
| 6,208,080 B1 | 3/2001 | King et al. | |
| 6,215,124 B1 | 4/2001 | King | |
| 6,445,353 B1 * | 9/2002 | Weinbrenner | 343/763 |
| 6,449,941 B1 | 9/2002 | Warboys et al. | |
| 6,456,011 B1 | 9/2002 | Bugrova et al. | |
| 6,525,480 B1 | 2/2003 | Hargus, Jr. et al. | |
| 6,612,105 B1 | 9/2003 | Voigt et al. | |
| 6,640,535 B2 | 11/2003 | Gallimore et al. | |
| 2002/0008455 A1 | 1/2002 | Fisch et al. | |
| 2002/0116915 A1 | 8/2002 | Hruby et al. | |
| 2002/0145389 A1 | 10/2002 | Bugrova et al. | |
| 2002/0194833 A1 | 12/2002 | Gallimore et al. | |
| 2003/0048053 A1 | 3/2003 | Kornfeld et al. | |
| 2003/0057846 A1 | 3/2003 | Kornfeld et al. | |
| 2004/0135034 A1 * | 7/2004 | Abel et al. | 244/165 |

FOREIGN PATENT DOCUMENTS

| | | |
|---|---|---|
| EP | 468706 A3 * | 2/1992 |
| EP | 0 982 976 A1 | 1/2000 |

OTHER PUBLICATIONS

Richard R. Hofer et al., "Ion Voltage Diagnostics in the Far-Field Plume of a High-Specific Impulse Hall Thruster," 39$^{th}$ AIAA/ASME/SAE/ASEE Joint Propulsion Conference, Jul. 20-23, 2003.

Richard R. Hofer et al., "Ion Species Fractions in the Far-Field Plume of a High-Specific Impulse Hall Thruster," 39$^{th}$ AIAA/ASME/SAE/ASEE Joint Propulsion Conference, Jul. 20-23, 2003.

Richard R. hofer et al., "The Influence of Current Density and Magnetic Field Topography in Optimizing the Performance, Divergence, and Plasma Oscillations of High Specific Impulse Hall Thrusters," NASA/TM—2003-212605, IEPC-2003-142.

A.I, Morozov, Kurchatov Institute, "Stationary Plasma Thruster (SPT) Development Steps and Future Perspectives," 945 IEPC-93-101.

Richard R. Hofer et al., "Recent Results from Internal and Very-Near-Field Plasma Diagnostics of a High Specific Impulse Hall Thruster," NASA/CR-2003-212604, IEPC-2003-037.

* cited by examiner

ELIMINATION OF LIFETIME LIMITING MECHANISM OF HALL THRUSTERS

ORIGIN OF THE INVENTION

The invention described herein was made by employees of the United States Government and may be manufactured and used by or for the Government for Government purposes without payment of any royalties thereon or therefore.

BACKGROUND OF THE INVENTION

1. Field of Invention

This invention relates to Hall thrusters that are used in propulsion systems. Specifically, this invention relates to systems and methods that allow for the extensions in the useful lifetimes of Hall thrusters.

2. Description of Related Art

A Hall thruster is an electric propulsion device used principally for spacecraft propulsion. Hall thrusters rely on an annular ceramic discharge channel in which plasma is ionized and accelerated. The plasma is accelerated by a combined operation of axial electric and magnetic fields applied in the coaxial channel. Hall thrusters provide ion velocities in the range of 10 km/s to 35 km/s, with current densities, about 0.1 $A/cm^2$. The input power levels for most thrusters are in the general range of 0.5 kW to 10 kW.

While most Hall thrusters retain the same basic design, the specific details vary with the nominal operating parameters, such as the working gas, the gas flow rate and the discharge voltage. The general design parameters that are varied to meet specific requirements include the discharge channel geometry, the channel material, and the magnetic field distribution. The discharge channel is typically made of boron nitride, but other compositions are possible.

During normal use, the interaction between the plasma and the discharge channel results in erosion of the downstream edge of the channel, ultimately resulting in erosion of the surrounding magnetic system. The operational lifetime of Hall thrusters is determined by the amount of time the thruster can operate before the magnetic system is damaged by exposure to the plasma within the channel. The lifetime of state-of-the-art Hall thrusters is on the order of 10,000 hours. Thus, if there was a means of ensuring that the magnetic system is not exposed by erosion of the ceramic discharge channel, then the useful lifetime of a Hall thruster could be extended.

Several methods have been employed in the prior art to increase Hall thruster lifetime. Attempts have been made to identify and incorporate discharge chamber materials with high resistance to erosion. Prior techniques for extending operational lifetime include increasing the thickness of the discharge channel material, magnetically shielding the discharge channel material from the plasma, and controlling the energy of the plasma interacting with the discharge channel.

However, none of the prior techniques implemented have eliminated the life limiting mechanism of Hall thrusters. Additionally, some of the prior techniques introduced negative effects on thruster performance. Thus, there is a need in the prior art to have Hall thrusters with increased usable lifetimes.

SUMMARY OF THE INVENTION

According to one embodiment of the invention, a Hall thruster includes inner and outer electromagnets, with the outer electromagnet circumferentially surrounding the inner electromagnet along a centerline axis and separated therefrom, inner and outer poles, in physical connection with their respective inner and outer electromagnets, with the inner pole having a mostly circular shape and the outer pole having a mostly annular shape, a discharge chamber separating the inner and outer poles, a combined anode electrode/gaseous propellant distributor, located at an upstream portion of the discharge chamber and acts to supply propellant gas and an actuator, in contact with a sleeve portion of the discharge chamber. The actuator is configured to extend the sleeve portion of the discharge chamber along the centerline axis with respect to the inner and outer poles.

Additionally, the actuator may be a mechanical actuator, a motor connected to an extension apparatus or a piezoelectric transducer. The actuator may be configured to extend the sleeve portion of the discharge chamber while keeping the upstream portion of the discharge chamber stationary.

Also, the actuator may be programmable in that the operation of the actuator is effected through a series of programming steps. The actuator may also include a timer and the actuator may be programmed to extend the sleeve portion of the discharge chamber a predetermined distance after the timer has measured a predetermined period of time. The actuator may be programmed to monitor operational conditions of the Hall thruster and to extend the sleeve portion of the discharge chamber based on changes to the operational conditions of the Hall thruster. Also, the actuator may be programmed to extend the sleeve portion of the discharge chamber in order to prevent plasma exposure of at least one of the inner and outer poles.

According to another embodiment, a process for extending a useful lifetime of a Hall thruster is disclosed. The Hall thruster has an annular discharge chamber separating inner and outer poles, with the inner pole, the discharge chamber, and the outer pole being circumferentially arranged around a centerline axis, and having a plasma formed in the discharge chamber during operation of the Hall thruster. The process includes the step of extending a sleeve portion of the discharge chamber along the centerline axis with respect to the inner and outer poles while keeping an upstream portion of the discharge chamber stationary.

According to another embodiment, a Hall thruster includes annular discharge chamber means for facilitating a plasma discharge, the discharge chamber means separating inner and outer poles, with the inner pole, the discharge chamber means, and the outer pole being circumferentially arranged around a centerline axis and actuating means for extending a sleeve portion of the discharge chamber means along the centerline axis with respect to the inner and outer poles while keeping an upstream portion of the discharge chamber means stationary.

These and other variations of the present invention will be described in or be apparent from the following description of the preferred embodiments.

BRIEF DESCRIPTION OF THE DRAWINGS

For the present invention to be easily understood and readily practiced, the present invention will now be described, for purposes of illustration and not limitation, in conjunction with the following figures:

FIG. 2 provides explanatory diagrams illustrating the process of channel erosion during use of a Hall thruster, with FIGS. 2(*a*) and 2(*b*) illustrating the channel before and after erosion, respectively, according to at least one embodiment of the present invention;

DETAILED DESCRIPTION OF PREFERRED EMBODIMENTS

Hall thrusters are considered an enabling space propulsion technology. The technology is now being considered by mission planners for a range of applications. The operational lifetime of Hall thrusters, defined as the duration over which the thruster can be used to produce the thrust required to perform spacecraft maneuvers, among other tasks, is limited by erosion of the annular ceramic discharge channel that contains the ionized propellant, as discussed below. The present invention seeks to eliminate the life limiting impact of discharge channel erosion through in-situ replacement of the eroded discharge channel material. Elimination of the life limiting mechanism of the Hall thruster will extend the range of applications for which the technology can be used.

Figure 2A:
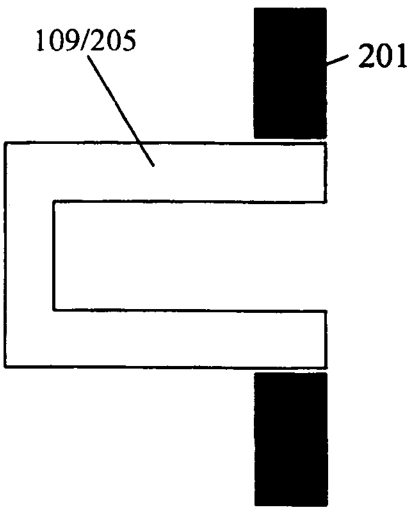
FIG. 2 provides explanatory diagrams illustrating the process of channel erosion during use of a Hall thruster, according to at least one embodiment of the present invention.
Figure 2B:
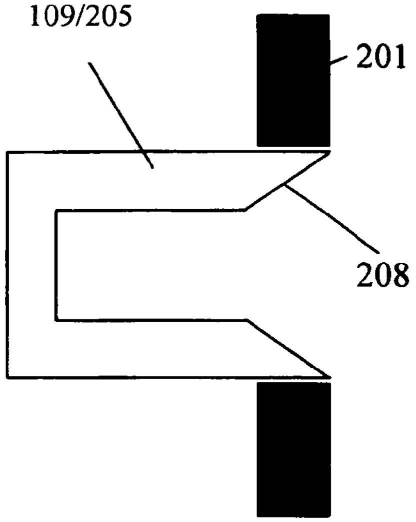

The Hall thruster produces an ionized plasma that is accelerated to exhaust velocities in excess of 10,000 m/s to produce thrust. An unintended result of producing high energy ions within an annular ceramic discharge channel is erosion of the discharge channel. A change in discharge channel geometry is depicted in FIGS. 2(*a*) and 2(*b*). As illustrated in FIG. 2(*a*), the initial geometry of a portion of the Hall thruster is shown, with the discharge channel 205 protecting the magnetic pole portions 201. After time with use, as illustrated in FIG. 2(*b*), erosion of the channel 208 is created which may potentially expose the magnetic pole portions 201 to plasma in the discharge channel.

Figure 3:
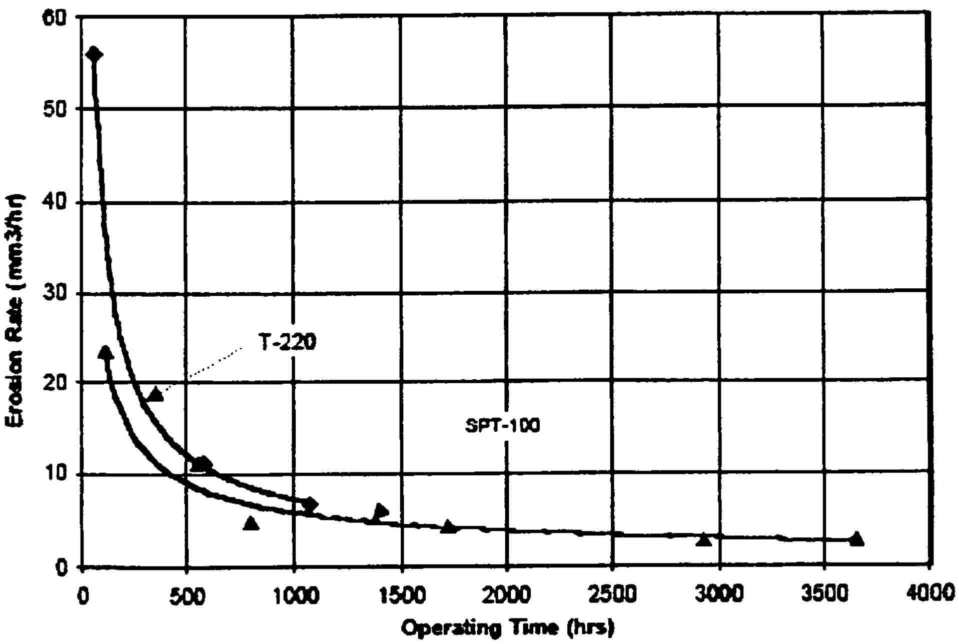
FIG. 3 provides graphical evidence of the operating times versus erosion rates, according to data from the testing of prior art Hall thrusters.

Increasing exhaust velocity or increasing propellant flow rate both have a negative impact on operational lifetime by increasing channel erosion. Therefore, Hall thruster performance directly impacts operational lifetime. The experimentally measured volumetric erosion rates of two Hall thrusters are shown as a function of time in FIG. 3. The results are taken from Mason, L. S. et al., "1000 Hours of Testing on a 10 Kilowatt Hall Effect Thruster," AIAA-2001-3773, July 2001. The erosion rate decreases significantly over the first 1500 hours of operation. This change corresponds to a change in the thruster's discharge channel geometry due to erosion. By eliminating the life limiting mechanism of discharge channel erosion, the performance capability of Hall thrusters may be extended.

The present invention seeks to eliminate the life limiting mechanism of Hall thrusters. This mechanism is the erosion of the discharge channel due to an interaction of the plasma with the channel ultimately resulting in erosion and degradation of the magnetic system required for operation. The end of life of a Hall thruster has been defined as the point in time when the magnetic pole pieces are damaged by exposure to the plasma. This life limitation is eliminated by in-situ replacement of the eroded boron nitride channel material.

It should be noted that such in-situ replacement of channel material can be accomplished in many ways, and that the present invention is not limited to a single method of in-situ replacement. The different types of in-situ replacement may in addition be employed in many different types of Hall thrusters. The discussion of in-situ replacement with respect to a specific configuration of a Hall thruster is only one example.

Figure 1:
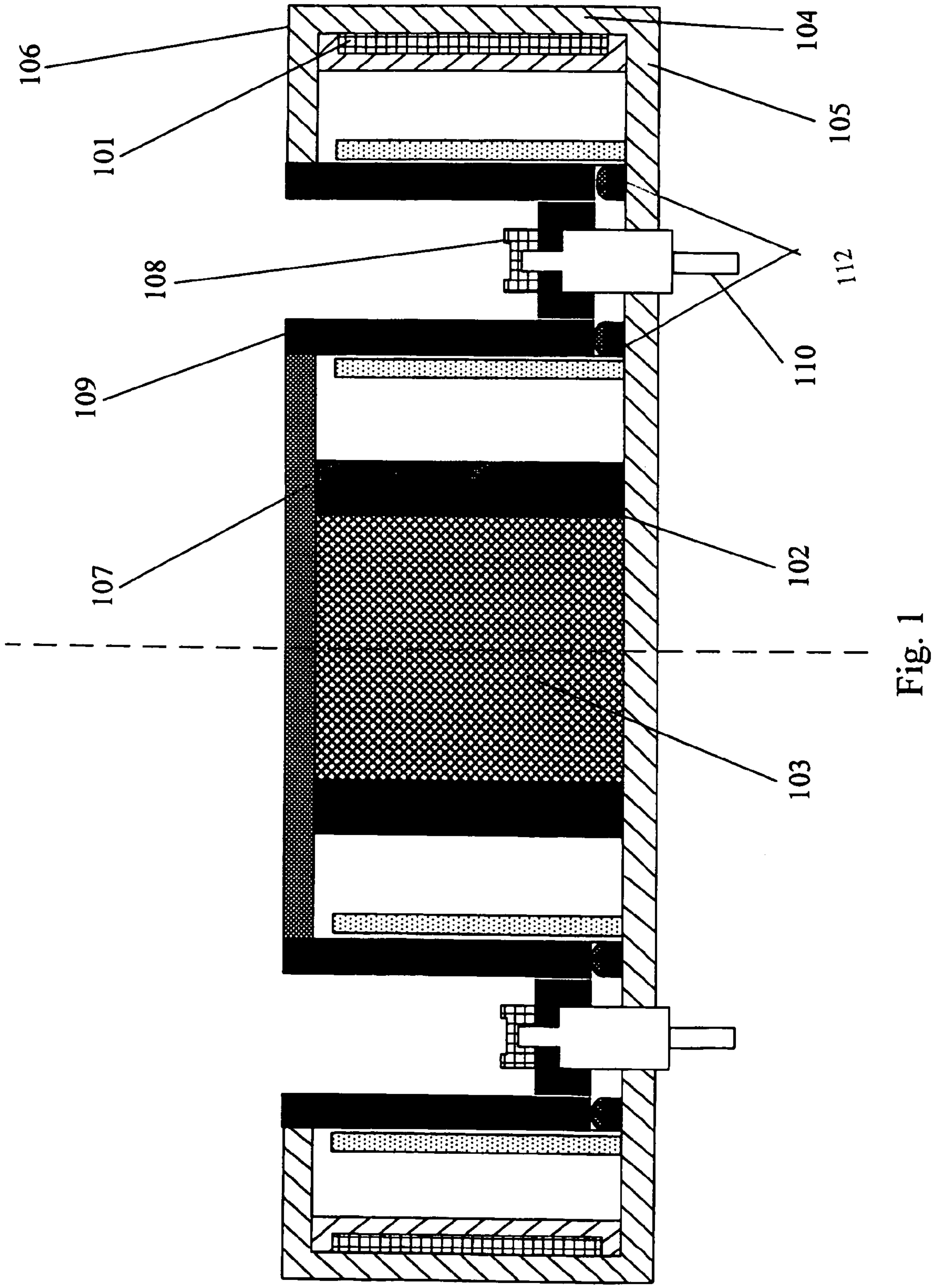
FIG. 1 is a cross sectional view of a Hall thruster, according to several embodiments of the present invention.

One such exemplary Hall thruster is illustrated in FIG. 1. The thruster is generally circular or cylindrical in structure, and is generally symmetric about a central axis. Such an axis is illustrated by the dashed line in FIG. 1 and while elements on the right-hand side of the schematic are described, such elements are also found on the left-hand side of the cross-section illustrated in FIG. 1. The thruster includes an outer electromagnet 101 and an inner electromagnet 102. The thruster also includes inner and outer magnetic conductors, 103 and 104, respectively, supported by a magnetically conducting back plate 105. The thruster also includes an outer pole 106 and an inner pole 107, protected from plasma exposure by a discharge chamber 109. Inside the discharge chamber is a combination anode-gas distributor 108 that acts to distribute propellant gases provided by a gas nozzle propellant line 110.

Figure 4:
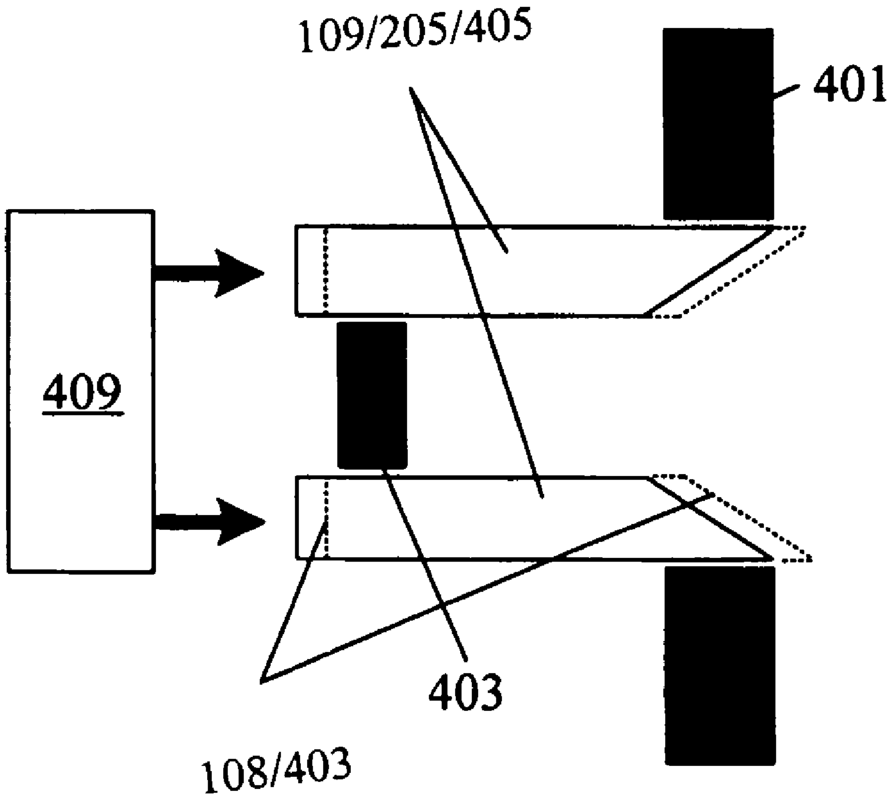
FIG. 4 provides a schematic illustrating the process of extending the discharge channel to compensate for erosion, according to at least one embodiment of the present invention.

Also included as a part of the thruster is actuator 112. The actuator acts to move portions of the discharge in a downstream direction to replenish portions of the discharge chamber that have been eroded. A simple schematic which depicts the magnetic pole pieces, and the channel in two positions is shown in FIG. 4. Therein, the actuator is illustrated as 409 and works to move portions of the discharge chamber 405 with respect to the anode 403 and the magnetic poles 401, such that the discharge chamber is shifted into position 408. In this case an alternate discharge channel configuration is employed allowing for axial movement of the channel replacing the eroded discharge channel with new material. Through such movement, the magnetic poles can be protected against exposure.

The actuator may work through mechanical actuation, through electrical actuation, or through some combination thereof. Mechanical methods may include screw or jack expansion, while electrical actuation may occur through a piezoelectric transducer. The actuation may also occur through the use of a motor to directly or indirectly move portions of the discharge chamber.

The actuator may have a configuration such as an annulus to follow the shape of the lowest portion of the discharge chamber, or may be formed by one or more actuators that may surround that lower circumference. Such an actuator may also be incorporated along an inner or outer surface of the discharge chamber to allow for movement of that discharge chamber.

It should be noted that the axial movement of 2 inches of discharge channel material will provide more than 100,000 hours of thruster operational lifetime. It should also be noted that the movement of the discharge chamber need not occur only upon potential uncovering of the magnetic pole. In other words, the advancement of the discharge chamber may be programmable such that a given amount of extension occurs over a given period of time. For example, the Hall thruster could be operated for a year and then the discharge chamber may be moved a fraction of an inch to compensate for the expected erosion.

It is also noted that the discharge chamber need not be divided into cup and sleeve portions, as discussed in embodiments above. The discharge chamber cup may remain intact (i.e. not segmented into an inner sleeve, outer sleeve and stationary base), according to alternate embodiments. However, the walls of the discharge chamber would be thinner to accommodate a cylinder on the outer diameter of the discharge chamber (between the outer pole and outside diameter of the channel) and a cylinder on the inner diameter of the discharge chamber (between the inner pole and inside of discharge channel). These two cylinders would become the actuated components. In this case, the stationary portion is not truly the "upstream portion" of the discharge chamber, but rather an entire cup Additionally, for purposes of the instant invention, the actuated cylinders would be portions of the discharge chamber.

Figure 5:
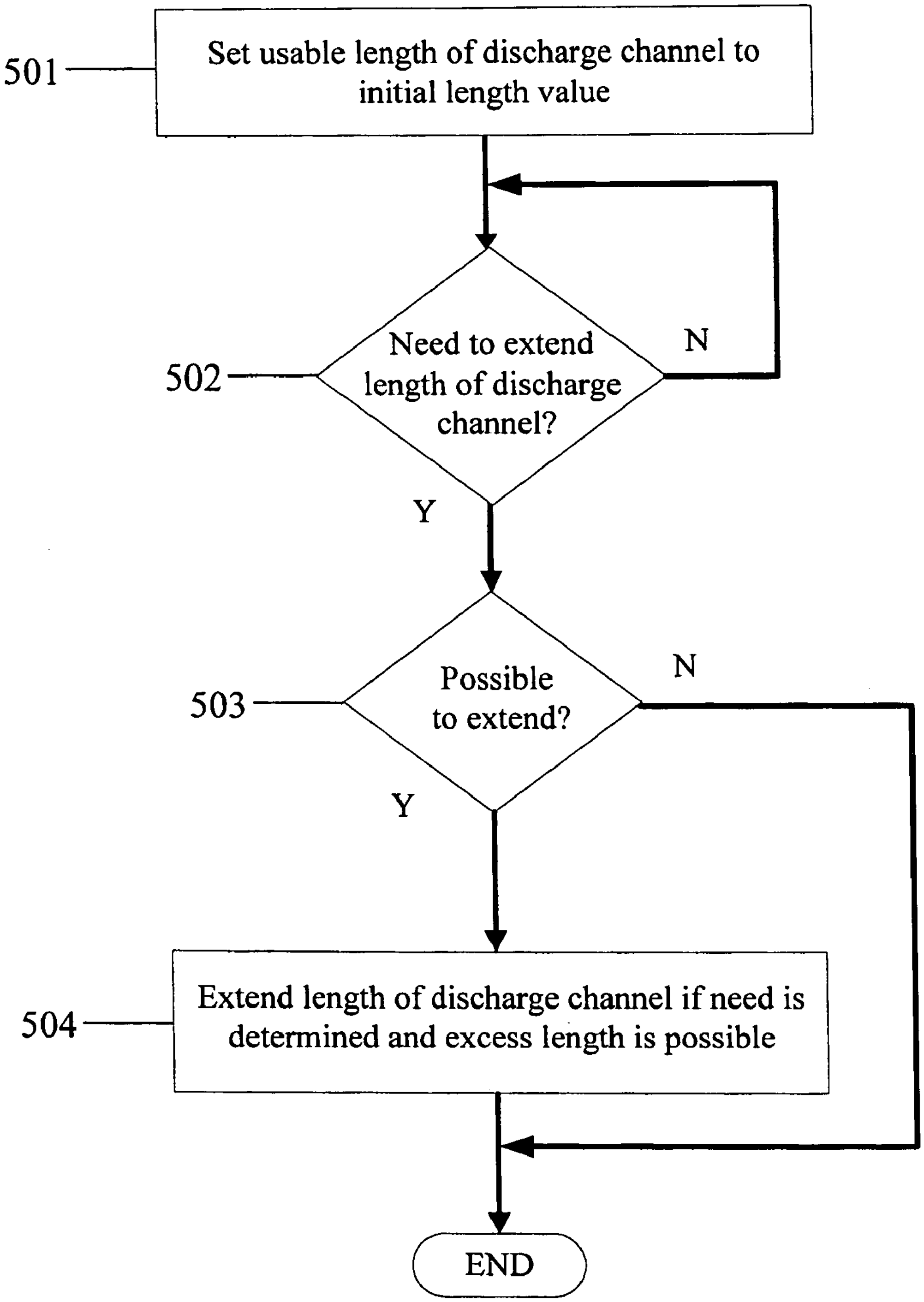
FIG. 5 provides a flowchart showing the process of automatically compensating for erosion of a discharge channel, according to one embodiment of the present invention.

In addition, the actuator may be programmable, such that it uses a feedback mechanism to determine if extension is warranted. One such programmable feature is illustrated in FIG. 5, where a usable length of the discharge channel is set to an initial length value, in step 501. Over operation of the Hall thruster, it is determined, in step 502, whether an extension of the discharge channel is needed. If the extension is not needed, the flow continues such that an additional evaluation is made subsequently. The process of determining can be made automatically on a temporal basis, or by examining the discharge chamber or physical characteristics of the Hall thruster itself to determine whether changes have occurred. If it is determined that an extension is needed, it is next determined whether an extension is possible, in step 503. An extension may not be possible if the discharge chamber has previously been extended to a limiting value. If prior extensions have previously used up the useful extension length, then the process ends. Such a "failure" may be reported out and the functioning of the Hall thruster and/or the spacecraft using the Hall thrusters may be modified to compensate. If the extension is needed and is possible, the discharge channel is extended, in step 504. In such a way, the amount of extension can be tailored to the actual performance of the thruster and utility of the extensions can be increased.

The present invention also has benefits for the testing of Hall thrusters. With conventional Hall thrusters, to determine a useful lifetime of a year, the thruster must be operated to failure as previously defined. Using the present invention, where compensation for erosion can be made, there is less time and money required to prove efficacy. In other words, the invention Hall thruster can be tested in segments and be shown to be reliable over a shorter space of time.

In summary, the present invention seeks to eliminate the life limiting mechanism of Hall thrusters. This life limitation is eliminated by in-situ replacement of the eroded channel material. The present invention may be used with any type of Hall thruster and an actuator to accomplish the extension of the channel and may be configured in any way that allows for proper extension.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A Hall thruster, comprising:

inner and outer electromagnets, with the outer electromagnet circumferentially surrounding the inner electromagnet along a centerline axis and separated therefrom;

inner and outer poles, in physical connection with their respective inner and outer electromagnets, with the inner pole having a mostly circular shape and the outer pole having a mostly annular shape;

a discharge chamber separating the inner and outer poles;

a combined anode electrode/gaseous propellant distributor, located at an upstream portion of the discharge chamber and supplying propellant gas; and an actuator, in contact with a sleeve portion or portions of the discharge chamber, wherein the actuator is configured to extend the sleeve portion or portions of the discharge chamber along the centerline axis with respect to the inner and outer poles, and the actuator is configured to extend the sleeve portion or portions based on operational conditions of the Hall thruster.

2. The Hall thruster of claim 1, wherein the actuator comprises a mechanical actuator.

3. The Hall thruster of claim 1, wherein the actuator comprises a motor connected to an extension apparatus.

4. The Hall thruster of claim 1, wherein the actuator comprises a piezoelectric transducer.

5. The Hall thruster of claim 1, wherein the actuator is configured to extend the sleeve portion or portions of the discharge chamber while keeping the upstream portion of the discharge chamber stationary.

6. The Hall thruster of claim 1, wherein the actuator is programmable in that the operation of the actuator is effected through a series of programming steps.

7. The Hall thruster of claim 6, wherein the actuator further comprises a timer and the actuator is programmed to extend the sleeve portion or portions of the discharge chamber a predetermined distance after the timer has measured a predetermined period of time.

8. The Hall thruster of claim 6, wherein the actuator is programmed to monitor operational conditions of the Hall thruster and to extend the sleeve portion or portions of the discharge chamber based on changes to the operational conditions of the Hall thruster.

9. The Hall thruster of claim 6, wherein the actuator is programmed to extend the sleeve portion or portions of the discharge chamber in order to prevent plasma exposure of at least one of the inner and outer poles.

10. A method for extending a useful lifetime of a Hall thruster, the Hall thruster having an annular discharge chamber separating inner and outer poles, with the inner pole, the discharge chamber, and the outer pole being circumferentially arranged around a centerline axis, and having a plasma formed in the discharge chamber during operation of the Hall thruster, comprising:

extending a sleeve portion or portions of the discharge chamber along the centerline axis with respect to the inner and outer poles while keeping an upstream portion of the discharge chamber stationary, wherein the sleeve portion or portions are extended to replenish portions of the discharge chamber that have been eroded during operation of the Hall thruster.

11. The process of claim 10, wherein the step of extending the sleeve portion or portions comprises activating a mechanical actuator to extend the sleeve portion or portions.

12. The process of claim 10, wherein the step of extending the sleeve portion or portions comprises activating a motor connected to an extension apparatus to extend the sleeve portion or portions.

13. The process of claim 10, wherein the step of extending the sleeve portion or portions comprises activating a piezoelectric transducer to extend the sleeve portion or portions.

14. The process of claim 10, wherein the step of extending the sleeve portion or portions comprises processing a series of programming steps to effectuate operation of an actuator.

15. The process of claim 10, wherein the step of extending the sleeve portion or portions comprises monitoring operational conditions of the Hall thruster and extending the sleeve portion or portions based on changes to the operational conditions of the Hall thruster.

16. The process of claim 10, wherein the step of extending the sleeve portion or portions comprises awaiting a timer to count for a predetermined period of time and extending the sleeve portion or portions of the discharge chamber a predetermined distance after the timer has reached the predetermined period of time.

17. The process of claim 10, wherein the step of extending the sleeve portion or portions comprises extending the sleeve portion or portions in order to prevent exposure of at least one of the inner and outer poles to the plasma.

18. A Hall thruster, comprising:

annular discharge chamber means for facilitating a plasma discharge, the discharge chamber means separating inner and outer poles, with the inner pole, the discharge chamber means, and the outer pole being circumferentially arranged around a centerline axis; and actuating means for extending a sleeve portion or portions of the discharge chamber means along the centerline axis with respect to the inner and outer poles while keeping an upstream portion of the discharge chamber means stationary, wherein the actuating means is configured to extend the sleeve portion or portions based on operational conditions of the Hall thruster.

19. The Hall thruster of claim 18, wherein the actuating means comprises mechanical actuating means for mechanically extending the sleeve portion or portions.

20. The Hall thruster of claim 18, wherein the actuating means comprises motor means for activating an extension apparatus to extend the sleeve portion or portions.

21. The Hall thruster of claim 18, wherein the actuating means comprises piezoelectric transducer means to extend the sleeve portion or portions.

22. The Hall thruster of claim 18, wherein the actuating means comprises processing means for processing a series of programming steps to effectuate operation of an actuator.

23. The Hall thruster of claim 18, wherein the actuating means comprises monitoring means for monitoring operational or physical conditions of the Hall thruster and extending means for extending the sleeve portion or portions based on changes to the operational conditions of the Hall thruster.

24. The Hall thruster of claim 18, wherein the actuating means comprises timing means for counting for a predetermined period of time and extending means for extending the sleeve portion or portions of the discharge chamber a predetermined distance after the timing means has reached the predetermined period of time.

25. The Hall thruster of claim 18, wherein the actuating means comprises extending means for extending the sleeve portion or portions in order to prevent exposure of at least one of the inner and outer poles to the plasma.

* * * * *